US011803663B2

(12) United States Patent
Beckman et al.

(10) Patent No.: US 11,803,663 B2
(45) Date of Patent: *Oct. 31, 2023

(54) SYSTEMS AND METHODS FOR MULTI-REGION DATA CENTER CONNECTIVITY

(71) Applicant: OPEN TEXT SA ULC, Halifax (CA)

(72) Inventors: Gregory Beckman, Baden (CA); Ryan Cathal Robert O'Toole, Kitchener (CA); Paul Turner, Wellesley (CA)

(73) Assignee: OPEN TEXT SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,480

(22) Filed: May 10, 2022

(65) Prior Publication Data

US 2022/0269822 A1    Aug. 25, 2022

Related U.S. Application Data

(63) Continuation of application No. 15/934,797, filed on Mar. 23, 2018, now Pat. No. 11,347,890.

(Continued)

(51) Int. Cl.
*G06F 16/9535* (2019.01)
*G06F 16/9537* (2019.01)
(Continued)

(52) U.S. Cl.
CPC ...... *G06F 21/6254* (2013.01); *G06F 16/9535* (2019.01); *G06F 16/9537* (2019.01); *G06F 21/45* (2013.01); *H04L 9/0869* (2013.01); *H04L 9/3242* (2013.01); *H04L 41/22* (2013.01); *H04L 51/046* (2013.01); *H04L 63/0407* (2013.01); *H04L 63/0421* (2013.01); *H04L 67/06* (2013.01); *H04L 67/10* (2013.01); *H04L 51/10* (2013.01); *H04L 51/222* (2022.05)

(58) Field of Classification Search
CPC ............ G06F 21/6254; G06F 16/9535; G06F 16/9537; G06F 21/45; H04L 9/3242; H04L 9/0869; H04L 41/22; H04L 51/046; H04L 63/0407; H04L 63/0421; H04L 67/06; H04L 67/10; H04L 51/10
See application file for complete search history.

(56) References Cited

U.S. PATENT DOCUMENTS 10,831,549 B1 * 11/2020 Radhakrishnan ..... G06F 9/5044
2017/0041296 A1 * 2/2017 Ford ...................... G06F 21/64
(Continued)

*Primary Examiner* — Trang T Doan
*Assistant Examiner* — Vladimir I Gavrilenko
(74) *Attorney, Agent, or Firm* — SPRINKLE IP LAW GROUP

(57) ABSTRACT

Disclosed is a multi-region data center connectivity solution for seamless integration between multi-region data center users and content. The solution supports user pinning (e.g., users and their personal content can be pinned to a particular geographical location/data center); protects personal content (e.g., personal content uploaded by a user is stored in that user's pinned geographical location/data center); and enables data sharing between multi-region data center users in a manner that is seamless and transparent to end users, while respecting user privacy, complying with data sovereignty requirements, and maintaining system anonymity.

20 Claims, 8 Drawing Sheets

Related U.S. Application Data

(60) Provisional application No. 62/476,624, filed on Mar. 24, 2017.

(51) Int. Cl.
*G06F 21/45* (2013.01)
*H04L 41/22* (2022.01)
*H04L 51/046* (2022.01)
*H04L 67/06* (2022.01)
*H04L 67/10* (2022.01)
*H04L 51/222* (2022.01)
*H04L 51/10* (2022.01)
*G06F 21/62* (2013.01)
*H04L 9/40* (2022.01)
*H04L 9/08* (2006.01)
*H04L 9/32* (2006.01)

(56) References Cited

U.S. PATENT DOCUMENTS

2018/0041496 A1* 2/2018 Shivanna ............ H04L 63/0823
2018/0082240 A1* 3/2018 Meyerzon ...... G06Q 10/063112

* cited by examiner

SYSTEMS AND METHODS FOR MULTI-REGION DATA CENTER CONNECTIVITY

CROSS-REFERENCE TO RELATED APPLICATION(S)

This application is a continuation of, and claims a benefit of priority under 35 U.S.C. 120 of the filing date of U.S. patent application Ser. No. 15/934,797, filed Mar. 23, 2018, issued as U.S. Pat. No. 11,347,890, entitled "SYSTEMS AND METHODS FOR MULTI-REGION DATA CENTER CONNECTIVITY," which claims a benefit of priority under 35 U.S.C. § 119(e) to U.S. Provisional Application No. 62/476,624, filed Mar. 24, 2017, entitled "SYSTEMS AND METHODS FOR MULTI-REGION DATA CENTER CONNECTIVITY," the entire contents of which are hereby expressly incorporated by reference for all purposes.

TECHNICAL FIELD

This disclosure relates generally to data processing in a network computing environment. More particularly, this disclosure relates to systems and methods for a new multi-region data center connectivity, useful for regional data centers that operate distinctly and independently to share user information and content data across geographical boundaries in a seamless and secure manner without compromising user privacy and system anonymity.

BACKGROUND OF THE RELATED ART

Today, many companies, corporations, organizations, enterprises, and entities alike operate globally. Some of their users may need to share information across geographical and/or jurisdictional boundaries. Because of regulatory and/or legal requirements, sharing data in such scenarios must be carefully handled so as to avoid legal exposure that may result in severe financial penalties.

One approach to handling the challenges in sharing data across geographical and/or jurisdictional boundaries involves isolating data centers and restricting users to access a particular data center operating in their particular region. For example, suppose users of a global enterprise utilize an information management (IM) application to share information and/or collaborate on a project. The IM application may be hosted in a cloud computing environment such as OpenText™ Cloud. OpenText™ Cloud is a purpose-built cloud environment for enterprise information management solutions that is supported by a global, scalable, and secure infrastructure.

Isolating data centers and restricting users to access a particular data center operating in their particular region means that an instance of an IM application would operate in a North American (NA) data center and another instance of the IM application would operate in a European (EU) data center. The NA data center and the EU data center would have separate databases and operate distinctly and independently of each other. NA users would access data stored in the NA data center database(s) by way of the NA instance of the IM application, while EU users would access data stored in the EU data center database(s) by way of the EU instance of the IM application. However, EU users cannot access data stored in the NA data center database(s) and NA users cannot access data stored in the EU data center database(s).

SUMMARY OF THE DISCLOSURE

The above-described isolation approach is not conducive to information sharing and collaboration on a global scale. What is needed, therefore, is a technical solution for seamless integration between multi-region data center users and content. Embodiments disclosed herein can address this need and more. More specifically, embodiments disclosed herein can support user pinning (e.g., users and their personal content can be pinned to a particular geographical location/data center); protect personal content (e.g., personal content uploaded by a user is stored in that user's pinned geographical location/data center); and enable data sharing between multi-region data center users in a manner that is seamless and transparent to end users, while respecting user privacy, complying with data sovereignty requirements, and maintaining system anonymity.

In some embodiments, a method for multi-region data center connectivity can include setting up a trusted relationship between a first data center operating in a first region and a second data center operating in a second region. The first data center and the second data center operate distinctly and independently from each other and each may have their own databases, applications, software and hardware resources, etc.

A first data center computer of the first data center may run an instance of an IM application and a second data center computer of the second data center may run another instance of the IM application. The IM application may run in a multitenancy environment. In this context, the first data center and the second data center may be referred to as "tenants." Multitenancy refers to a software architecture in which a single instance of software runs on a server and serves multiple tenants. A tenant is a group of users who share a common access with specific privileges to the software instance. In this context, the first data center and the second data center may be referred to as "tenants." With the trusted relationship established, the second data center can be characterized by the first data center as a trusted tenant. Multitenancy is known to those skilled in the art and thus is not further.

The method may further include, responsive to a first user supplying an email address of a second user via a graphical user interface of the instance of the 1M application running on the first data center computer, the instance of the IM application running on the first data center computer, via a lookup logic, operates to find the second user (e.g., using the email address of the second user provided by the first user). The instance of the IM application running on the first data center computer may first search locally within the first data center and then search remotely in the second data center with which the first data center has a trusted relationship.

If the second user is found in a database of the second data center (the trusted tenant), a small set, limited user data stored in the database may be used to generate a hash. The hash thus generated by the first data center can be used to uniquely identify the second user in the first data center. An entry is generated with the unique identifier (hash) of the second user and stored in a database of the first data center. Through this entry, the second user of the second data center is linked with the content stored in the first data center and shared by the first user. At this point, the second user of the second data center is considered to have been "stubbed" in the first data center. A reference to the shared data is created by the second data center for the second user. The shared data is not moved from the first data center to the second data center and no copy is made by and/or stored in the second data center. That is, the shared data remained in the first data center. What gets created is a link to the shared data.

The second user (which is also referred to as a "shared-to" user) now appears in a shared user list associated with the shared data. In some embodiments, only the first name, the last name, and, with the second user's consent, the email address of the second user, may appear on the shared user list in the first data center. From the perspective of the second user, the shared data now appears in the second user's file list. However, the shared data (shared by the first user) remains in the first data center. The graphical user interface for both instances of the IM application can appear identical or substantially similar to both the first and second users, except an icon or some element on their graphical user interface indicating the trusted link between them. In this way, the integration and data sharing between the first and second data centers can be seamless and transparent to the first and second users.

In one embodiment, a system may comprise at least one processor, at least one non-transitory computer-readable storage medium, and stored instructions translatable by the at least one processor to implement a method substantially as described herein. Another embodiment comprises a computer program product having at least one non-transitory computer-readable storage medium storing instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
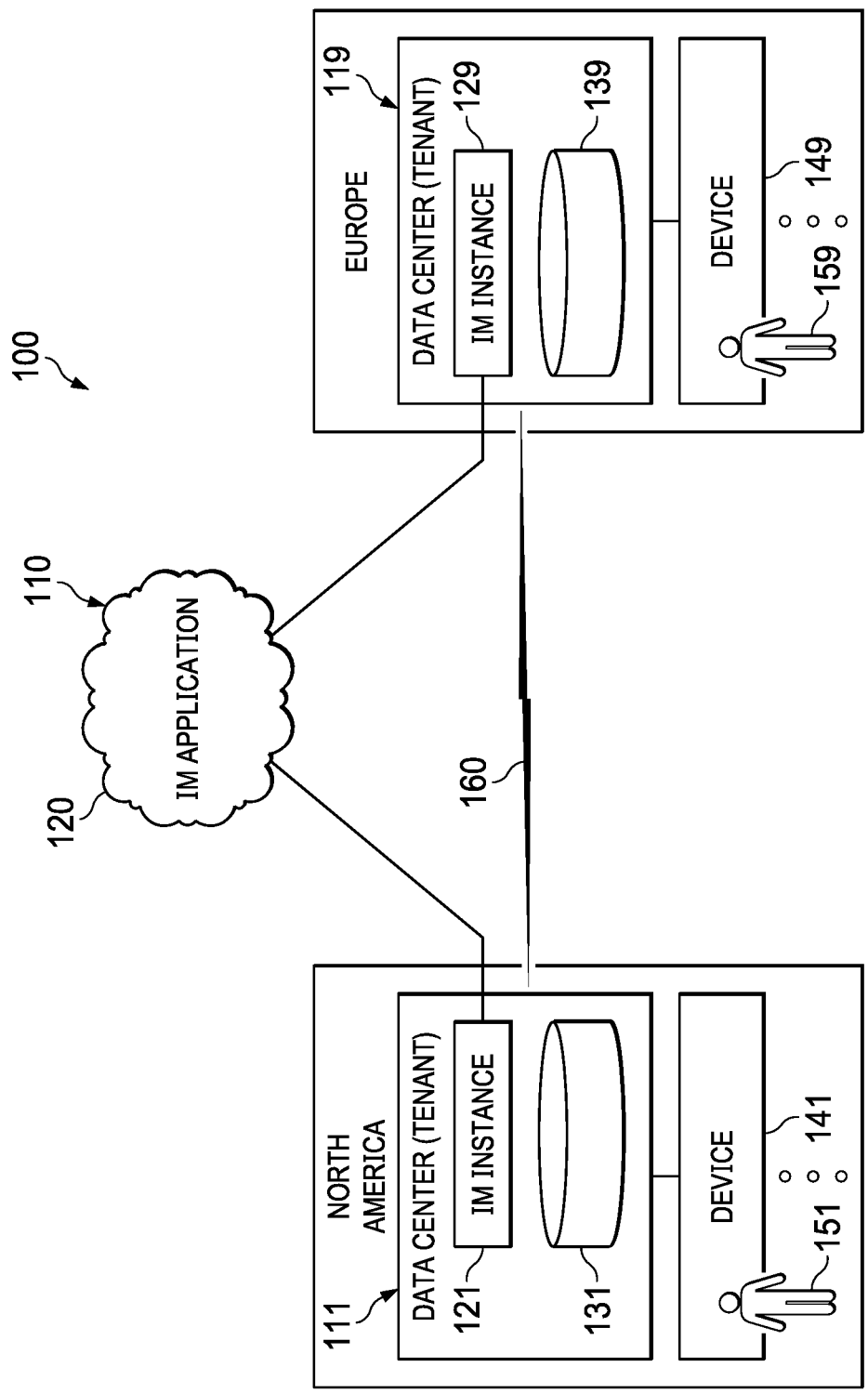
FIG. 1 depicts a diagrammatic representation of a computer network environment in which embodiments disclosed herein may be implemented.

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

As discussed above, an information management (IM) application, which can generally refer to any network-based file-sharing, synchronization, and/or collaboration application, may be hosted in a cloud computing environment such as OpenText™ Cloud. OpenText™ Core, available from Open Text which is headquartered in Canada, can be a non-limiting example of an IM application. OpenText™ Core provides secure sharing and collaboration on enterprise content in the cloud and adds cloud-native sharing and collaboration to existing enterprise content management (ECM) systems. OpenText™ Cloud and OpenText™ Core are known to those skilled in the art and thus are not further described herein.

In a cloud computing environment, instances of an IM application may operate in multiple regions such as North America, Europe, Middle East, and Africa regions. For example, an instance may operate in a North American (NA) data center and another instance of the IM application may operate in a European (EU) data center. The NA data center and the EU data center may have separate databases and operate distinctly and independently of each other. NA users may access data stored in the NA data center database(s) via the NA instance of the IM application and EU users may access data stored in the EU data center database(s) via the EU instance of the IM application.

The IM application may be owned and operated by a global enterprise and data centers operating instances of the IM application may be referred to as tenants. These tenants (e.g., NA and EU tenants) have separate administrators ("admin"). An NA admin can only administrate their tenant's users and configuration. Likewise, an EU admin can only administrate their tenant's users and configuration.

For security reasons, separate encryption keys may be used for NA and EU tenants for server-side encryption. A user of the enterprise can only exist in one tenant/instance and shared content is stored in the tenant/instance/geographical location of the share owner (a "share-from" user). Files and related metadata are stored in the same instance/geographical location.

In some embodiments, the IM application is particularly configured to enable cross-tenant and cross-instance trusts. To do so, the IM application is implemented with fundamental platform capabilities that extend across trusted tenants (e.g., dashboard, search, activity feeds, etc.). For example, the sharing logic of the IM application is particularly configured for supporting trusted tenants and the IM application has administrative controls and workflows that support tenant trusts.

Generally, auto-complete for users when sharing between different regional data centers is not available until after the user has been shared with once. This process is further described below with reference to the drawings. After a user has been shared with once across multi-region data centers through a trusted relationship, the IM application can perform auto-complete by performing a local search as well as a remote search (e.g., to look for the user in the database of a trusted tenant).

In some embodiments, through the trusted relationship, the IM application can support copying and yet limit moving shared data between multi-region data centers. In some embodiments, the IM application may implement trusted tenant user hash/partitions and provide notification and event-driven broadcast to trusted tenants.

An object of the invention is to connect distinct instances of an application (e.g., OpenText™ Core or any network-based file-sharing, synchronization, and/or collaboration application) across regions, for example, two data centers operating in two different regions, in a seamless and secure manner such that data (e.g., files) can be shared between these instances without disclosing users and personal information across the regions.

As skilled artisans can appreciate, sharing data between two systems on the same computer network can be a relatively straightforward process when both systems know (or had been set up with the knowledge) about each other. In such a case, users of both systems can share content over the computer network in a preconfigured manner. However, as illustrated in FIG. 1, sharing can be quite complicated in a cloud computing environment where data centers are physically located in different regions, sometimes across the globe, where different laws and regulations governing data sovereignty, privacy, data protection, etc. may apply.

In the example of FIG. 1, two systems may operate distinctly and independently in two different regions in cloud-based multitenancy environment 100. For example, IM application 120 may be hosted in cloud 110 which includes data center 111 operating in North America and data center 119 operating in Europe. Data center 111 and data center 119 run instances 121, 129 of IM application 120 in cloud-based multitenancy environment 100. A tenant in a multitenancy environment refers to a group of users who share a common access with specific privileges to each such instance. Accordingly, data centers 111, 119 may be referred to herein as "tenants."

Each tenant may have their own application servers, sharing logic, lookup logic, databases (e.g., databases 131, 139), security measures, and software and hardware resources as well as administers, etc. Additionally, different geographical regions may have varying data protection and/or privacy requirements (e.g., the European General Data Protection Regulation (GDPR), the Health Insurance Portability and Accountability Act of 1996 (HIPPA) in the U.S., or any regulation concerning personally identifiable information (PII) or sensitive personal information (SPI), etc.). In some cases, it may be desirable that instances 121, 129 of IM application 120 running on these systems would appear, from an end user's perspective, as if they are linked.

To achieve this goal, embodiments may allow a user (e.g., user 151 associated with device 141) to share with another user (e.g., user 159 associated with device 149) in another region. This may be possible via trust relationship 160 established between data center 111 in North America and data center 119 in Europe. Data center 111 in North America and data center 119 in Europe can share files across, but not all the user information. This allows each user to retain their privacy and each system to retain their anonymity, operation independence, and data sovereignty, etc., in compliance with the data protection and/or privacy laws and/or regulations in their respective regions.

FIGS. 2-7 illustrate a non-limiting example of operation implementing a multi-region data center connectivity solution disclosed herein. In this example, suppose a user (e.g., Paul Turner) in North America wishes to share a file with a user (e.g., John Doe) in Europe with whom no one in North America has ever shared. Further suppose that an NA data center (e.g., data center 111) has a trusted relationship with an EU data center (data center 119).

Such a trusted relationship can be established by a secure link (e.g., trusted connection 160) that exposes both systems (e.g., IM instances 121, 129 running on data centers 111, 119). This secure link can be established and authorized by administrators in North America and Europe. For example, an NA administrator in the NA data center can send a trust relationship application programming interface (API) key and a secure trust authorization to an EU administrator in Europe. These administrators can use the API key to set up a trusted connection between these tenants (data centers 111, 119) so that the API in the NA data center can communicate with the API in the EU data center. The trust relationship API key can link the two systems together and allow communications to take place between these distinct systems.

Through this trust relationship, these systems can share user information and content data in a special way. For example, the NA data center can represent an EU user in the NA system with limited user data (e.g., a first name and a last name in an entry of a trust table having a unique identifier associated with the EU user) without taking all of the EU user's information from the EU data center and storing all of the EU user's information in a database at the NA data center. Technically, it is not impossible to take all of the EU user's information from the EU data center. However, there are potential risks and confidentiality issues. For example, data protection and/or privacy rules governing user information have to be follows. Accordingly, once a connection is securely made and if a user is found in another region, there are technical challenges in how to create links for the actual application object, such as the user and/or the content to be shared, in a way that they can be represented in each system without disclosing all of the information.

Figure 2:
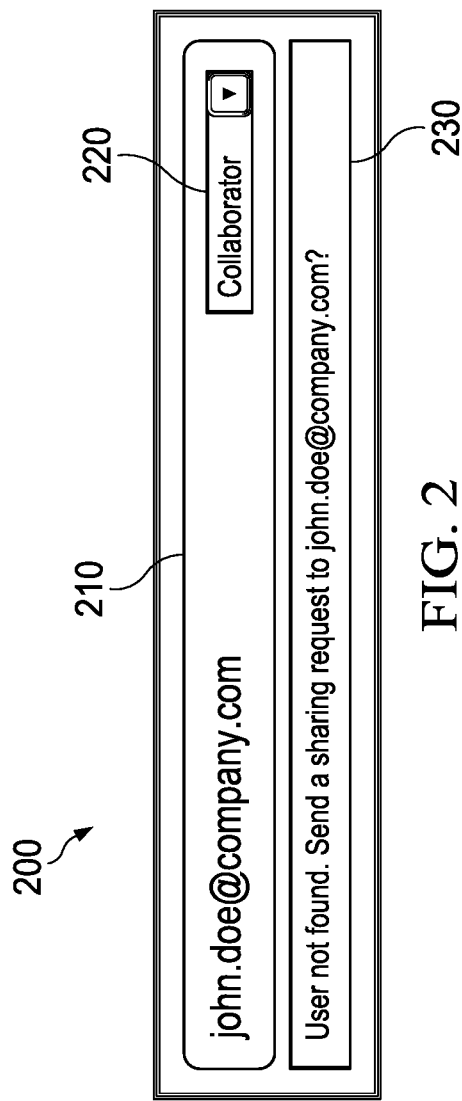
FIGS. 2-7 illustrate a non-limiting example of operation implementing a multi-region data center connectivity solution disclosed herein.

As illustrated in FIG. 2, a sharing process may begin when an NA user "Paul Turner" enters an email address of a "share-to" user in input field 210 of graphical user interface (GUI) 200 of an instance of an IM application (e.g., IM instance 121). The NA user may identify role 220 (e.g., a collaborator) of the "share-to" user. In this example, the "share-to" user "John Doe" is in EU and has never been shared with by any NA users. Thus, the email address of the "share-to" user could not be found in the NA data center where the instance of the IM application is hosted. As a result, the instance of the IM application returns message 230 to the "share-from" user through GUI 200 that the "shared-to" user was not found and asks whether the "share-from" user would like to send a sharing request to the "shared-to" user.

Figure 3:
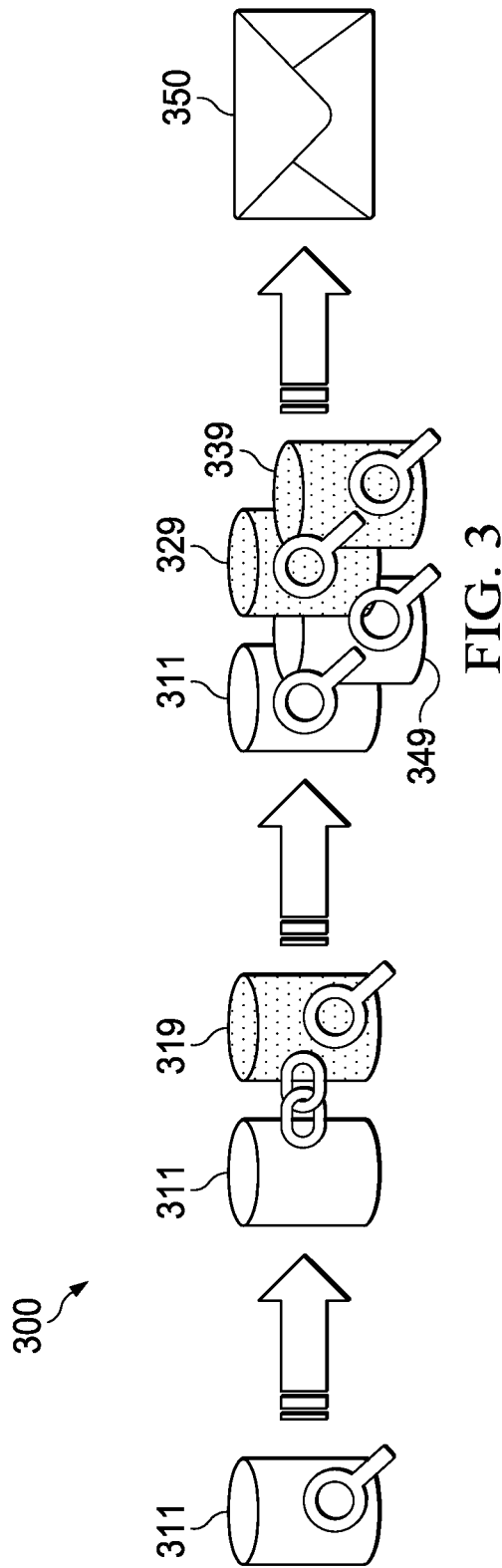

In some embodiments, the determination as to whether the email address of the "share-to" user does or does not exist in the NA data center can be performed by lookup logic of the instance of the IM application. FIG. 3 depicts a diagrammatic representation of a process flow performed by lookup logic 300 responsive to user interaction with GUI 200 shown in FIG. 2.

In some embodiments, lookup logic 300 may first search user email addresses in database 311 local to the NA user (e.g., in data center 111). If there is an email address in NA database 311 that matches the email address provided by the NA user, then a sharing logic (described below) would proceed to allow the NA user to share with another NA user. If no matching email address could be found in NA database 311, lookup logic 300 may search EU database 319 using the trusted connection. If there is an email address in EU database 319 that matches the email address provided by the NA user, then the sharing logic would proceed to FIG. 4. Otherwise, lookup logic 300 may search other NA databases 329, 339, 349 (which, in this case, represent multiple database tiers for the same tenant) in the region and send out invitation or message 350 inviting the new "shared-to" user to create a new account with the NA instance of the IM application. Since databases 311, 329, 339, 349 are in the same region, data shared among them do not cross geographical boundaries. Thus, no special trusted connections are needed.

Figure 4:
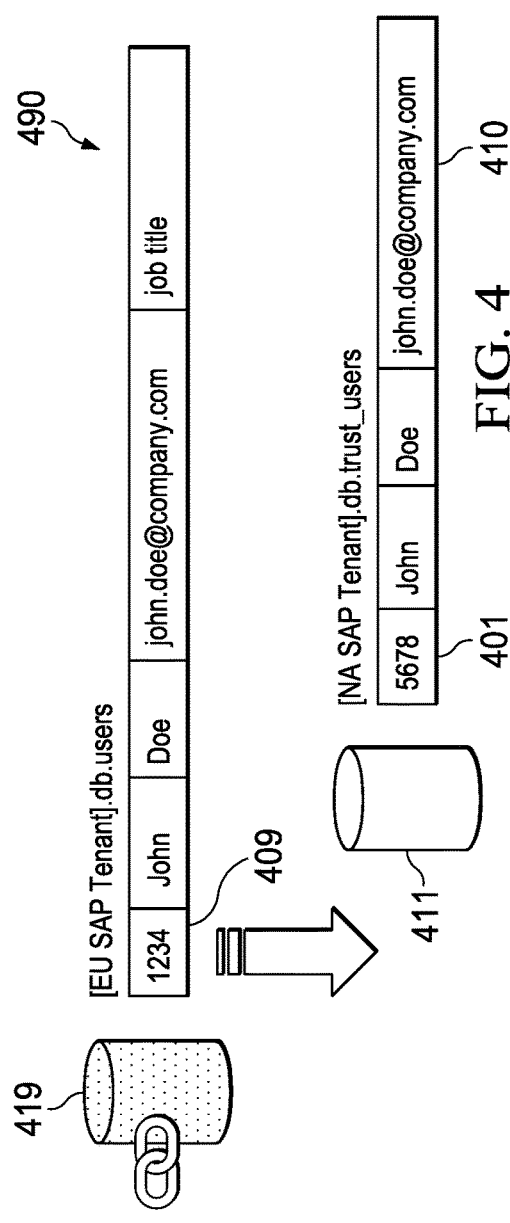

Suppose an email address in EU database 319 matches the email address provided by the NA user, a hash may be generated based on a small set, limited user data of the EU user whose email address was found in EU database 319. In the example of FIG. 4, entry 409 of EU user 490 "John Doe" was found in EU database 419 and his first name, last name, and email address (given the consent that the EU user may have indicated) can be used to generate unique identifier 401 (which, in this example, is a four digit hash "5678"). In one embodiment, unique identifier 401 can be a globally unique identifier (GUID).

In some embodiment, the backend logic at the NA data center may only create a hash of the user data and store a subset of what it would need to uniquely identify that user across the systems. The hash (e.g., unique identifier 401) is used to represent that user throughout the remaining system to obfuscate the user's personal information such as job title, address, or any identifying information. The NA user would still be able to view the EU user's name and, in some cases, the email address (when there is consent by the EU user to disclose that information). However, the NA system only references the hash value (e.g., unique identifier 401). This provides a degree of anonymity for the underlying EU system where the EU user's data are stored.

Further, to respect the data protection and/or privacy rules of the respective regions (in this case, NA and EU), only a limited set of information is crossing that pipe (in this case, a trusted connection between the NA system and the EU system). As illustrated in FIG. 4, in the NA system, the limited user data from the EU system is used to generate a hash (e.g., unique identifier 401) and create a stub (e.g., entry 410) for the EU user, identified by the hash thus generated (e.g., unique identifier 401). Entry 410 can be stored by the NA system in trust table 411 for trusted users and, as shown in FIG. 4, only a limited set of information pertaining to the EU user (e.g., user 490) is stored in entry 410 of trust table 411 to facilitate fast lookup and seamless future sharing.

In some embodiments, such a hash (e.g., unique identifier 401) can be a randomly generated key. Although a four digit code is illustrated in FIG. 4, skilled artisans understand that many hash algorithms and/or functions can be used and hashes thus generated (i.e., randomly generated keys) may be in various forms.

Figure 5:
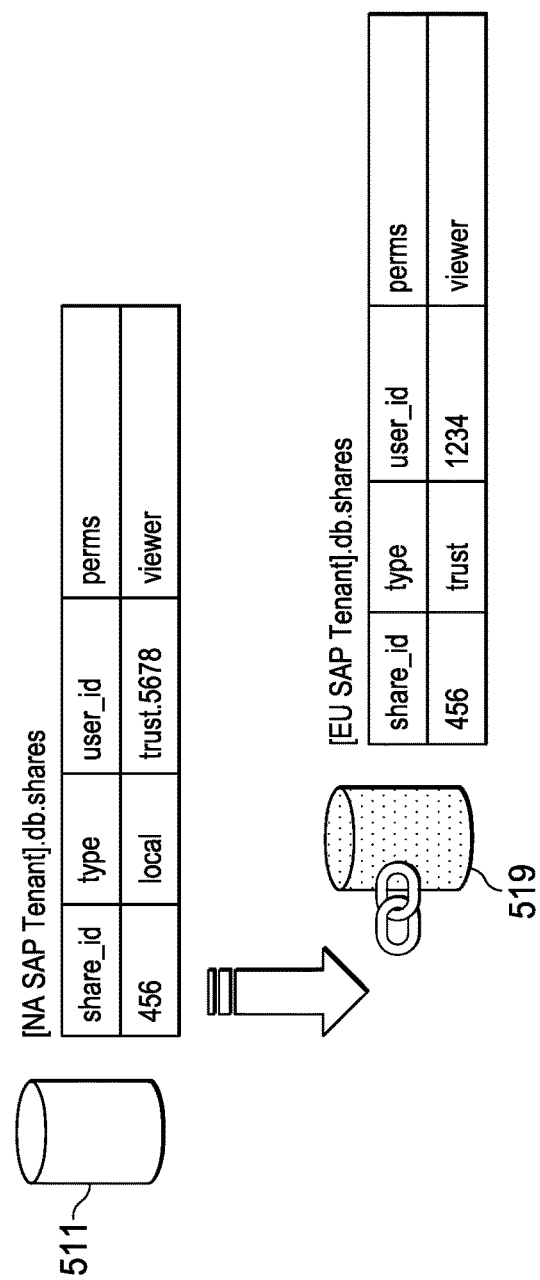

In some embodiments, the unique identifier (a hash or a randomly generated key) generated by the NA system can be used by the EU system in creating a stub or entry that references the content shared to the EU user by the NA user. This is illustrated in FIG. 5. In some embodiments, EU system 519 may receive a notification or message from NA system 511. The message may contain a unique identifier and a permission for an EU user (who is a "trusted" user from the perspective of NA system 511 as there is an entry for that EU user in a trust table of NA system 511, similar to trust table 411 described above) to view content shared by an NA user and stored in NA system 511.

In some embodiments, such a trusted user can be identified by a user identifier in the form of a special trust user identifier structure "trust.hash" (e.g., "trust.5678" as shown in FIG. 5) and the shared content can be linked to the trusted user account that was stubbed out in NA system 511 (similar to how entry 410 was stubbed out in trust table 411). That is, the same unique identifier (e.g., "5678") generated by NA system 511 to identify the EU user as a trusted user in a trust table of NA system 511 can be used to form or construct a user identifier ("trust.5678") associated with a particular share (identified by a share identifier "456" in the example of FIG. 5).

EU system 519 may link the EU user (a trusted user of NA system 511) with the shared content stored in NA system 511. As illustrated in FIG. 5, this can be done by creating an entry in a table that contains the share identifier (e.g., "456") for the shared content (in this case, stored in NA system 511) and associated permission (in this case "viewer") and its internal user identifier (e.g., "1234") for the EU user. Because the content is stored in NA system 511 with which EU system 519 has a trusted relationship, EU system 519 identifies in the entry the shared content is of the "trust" type. Here, the share identifier or "share_id" ("456") is used by both systems, but the shared content is not moved or copied. That is, no copy or replication of files would be moved across data centers (e.g., NA system 511 and EU system 519). Instead, EU system 519 may only reference the shared content (e.g., by creating an entry or record in EU system 519 to reference or link the shared content that is stored in NA system 511). The reference (e.g., a link) to the shared data is stored in the trusted tenant only. In this way, a relationship can be created between the trusted user account and the data that is being shared. That is, the EU user is represented in the NA database through the limited user data and the shared content is represented in the EU database through a reference to the shared content.

One reason that both systems generate such linked representations (of limited user data and of shared content data) in their respective systems is that the NA system owns the relationship and the permission, so the NA entry is essentially entitling the EU user access to view the shared data in the NA system. The EU system has reference to it, so that if the EU user wants to do a search, or anything with the application instance in their home system (which is how they would access the application), they could still view that shared data and/or search that shared data. However, the shared data is not moved to the EU system (i.e., the shared data is not moved across different geographical regions). This provides users with a seamless experience when the users interact with the application, even though instances of the application may run on distinct data centers that operate across geographical boundaries.

As illustrated in FIG. 5, a share identifier is issued and different types of shares can be identified for the same share identifier, for instance, a local type share in the NA system versus a trusted (remote) share in the EU system. This can be useful in identifying a share for multiple users. The "perms" in FIG. 5 refers to the level of permissions that a user has on the share. This establishes a level of permission the user has access to the shared data thus identified by the share identifier.

In some embodiments, in the case of a "user" creation (e.g., to add to a shard user list), the EU system or the NA system can perform that logic themselves. For example, if the NA system finds the EU user, it may request a small set of user data via the API trusted connection with the EU system. The EU system may communicate with the NA system the requested limited user data and the NA system can operate to create an entry in a database for the EU user, as described above, and send a notification to the EU system, requesting that the EU system to create, for the EU user, an entry for representation of a file or any shared content having a particular share identifier. Notice the NA system does not need to communicate the file/content or even what is being shared. Rather, the NA system may provide a location of the file/content being shared for the EU user. In this way, no content data is exchanged or moved.

The EU system can create an entry in its database and sends an acknowledgement. The communication (request and acknowledgement) can be done asynchronously over any suitable secure connection (e.g., via a REST API call, Secure Socket Layer connection, etc.). In some embodiments, the NA system may implement a broadcast model and broadcast the request. Skilled artisans appreciate that there are many ways to implement the secure communications between these systems. Skilled artisans also appreciate that no data is moved when shared between these systems. Rather, the systems, examples of which are disclosed herein, create reference points in both systems that link a remote user with local content. If a user is in one region and the shared content resides in another region, the user's regional data center (system) can create a reference for the user to access the shared content in another region.

Figures 6, 7:
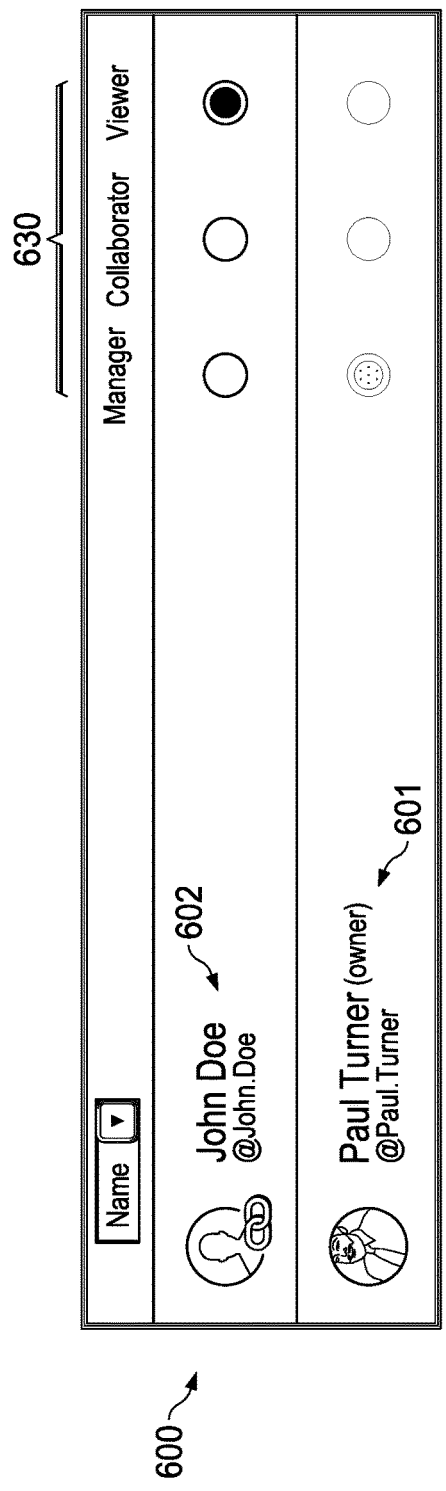

As illustrated in FIG. 6, the above-described process can be transparent to end users. In the example of FIG. 6, which depicts a diagrammatic representation of GUI 600 of an IM application (e.g., IM application 120), owner 601 is the user who initiated the process to share a file with user 602. The only indication on GUI 600 that user 602 is a trusted user (instead of a local user in the same region as owner 601) is that there is a GUI element resembling a link that is positioned proximate to a profile icon, image, thumbnail, or name representing user 602. Other than that, the trusted user appears in the list of users with whom the content is shared the same as other users (e.g., users who are local to owner 601) and can be managed as any other user on the share.

As also illustrated in FIG. 6, role 630 of user 602 is identified as a viewer in this example. FIG. 7 depicts a diagrammatic representation of GUI 700 of an IM application from the perspective of a trusted user (e.g., user 602). As illustrated in FIG. 7, the trusted user can have their own list of content (e.g., content list 705), including the content that the owner of the content (which is physically located in another geographical region) has shared with him. The trusted user can view the shared content just like any other content on their content list. The only indication on GUI 700 that the content, which is not owned by the trusted user, is stored in a database remote to the trusted user is that GUI 700 displays GUI element 715 resembling a link that is positioned proximate to an icon, image, thumbnail, or name representing the shared content.

When the trusted user opens a file that was shared by the file's owner, the application logic in the EU system may operate to check the trust type and search the trust source for the requested content using the share identifier (e.g., "share_id 456" in the example of FIG. 5). Since the NA system is a trusted tenant, the EU system may send over an API key and information on what the trusted user (an EU user) is requesting what file from the NA system. Additional checks may be implemented, e.g., check to see if a trust relationship exists, check the EU user's permission level to confirm whether the EU user has the proper permission to download, etc. If the trusted user has been granted by the content owner to view and download, he can view and download the file.

In some embodiments, if the trusted user wants to download the shared content, and is allowed to do so, the EU system can fetch the shared content from the NA system using the shared identifier. Since the share type in this case is "trust," the application logic of the EU system knows that it has to go to a trusted connection/tenant, where the shared content is located, and from there gets routed to the NA system where the content is stored.

Once a trusted user (in the above example, an EU user) is created, other users do not have to go through what the first "share-from" user (in the above example, an NA user) had already gone through in order to share with the same user (i.e., a "share-to" user who is located in a different region from "share-from" users). An example of this scenario is illustrated in FIG. 8.

Figure 8:
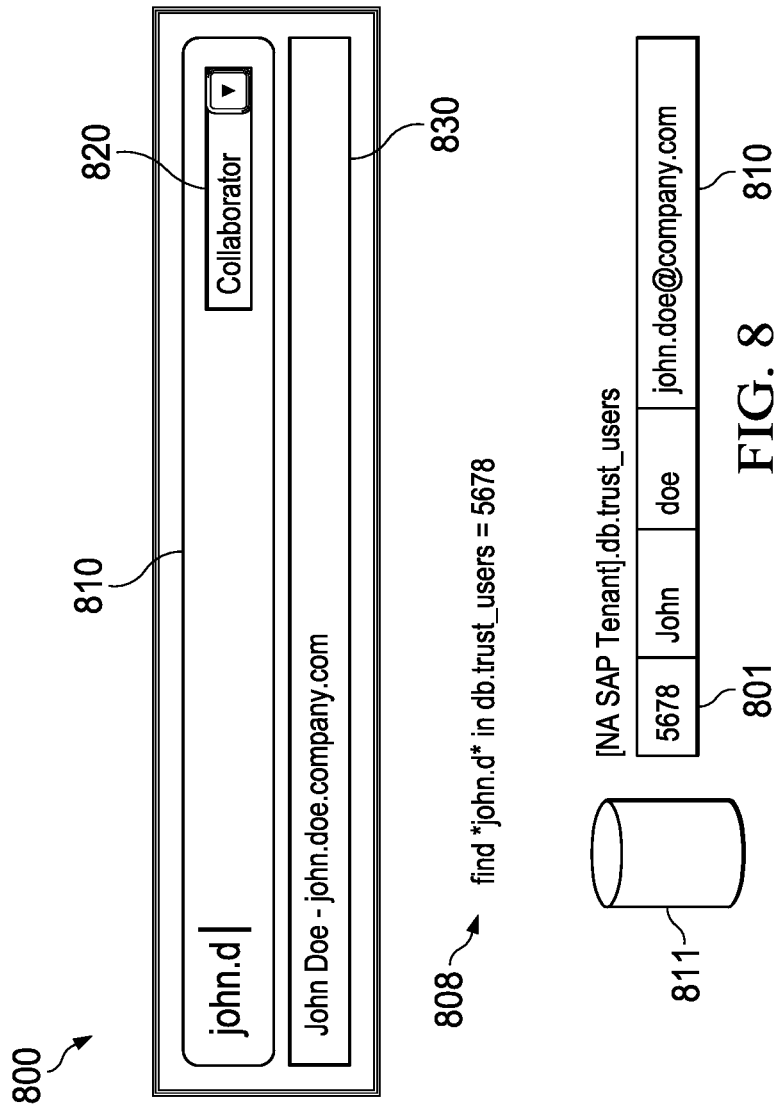
FIG. 8 depicts a diagrammatical representation of a user interface for a first user located in a first geographical region to share content with a second user located in a second geographical region according to some embodiments disclosed herein.

FIG. 8 depicts a diagrammatical representation of GUI 800 for an instance of an IM application hosted by a data center (e.g., NA system 811) in a first geographical region. As described before, when a user in North America wants to share content with another user, the user in North America enters the "shared-to" user's email address in input field 810 of GUI 800. Lookup logic 808 at NA system 811 may operate to look up the email address as it was entered in input field 810. In this case, the "shared-to" user has been previously set up as a trusted user by NA system 811. As a result, lookup logic 808 is able to find entry 810 in a trust table for a trusted user who has already been stubbed in NA system 811 and use email address 810 stored in entry 810 to automatically complete or display (e.g., through popup window 830) the email address as the user in North America is entering the email address. In one embodiment, role 820 associated with the trusted user may also be displayed through GUI 800. In this case, NA system 811 does not need to create another entry for the "shared-to" user.

That is, as a "shared-from" user is typing an email address for a "shared-to" user through a GUI of the IM application, the lookup logic of the IM application is operable to search the trust table maintained by the data center hosting the IM application. The lookup logic can automatically provide, as a suggestion, the rest of the email address and/or user information of a trusted user corresponding to the "shared-to" user found in the trust table.

In the first scenario, illustrated in FIGS. 2-7, such a suggestion cannot be provided by the IM application because no one in North America had shared with the EU user (and hence the EU user was not yet a trusted user in the NA system). Thus, the NA system will not search for a "shared-to" user in the trust table until someone in the NA system has shared with that "shared-to" user and he/she becomes a trusted user.

Once a "shared-to" user becomes a trusted user, the NA system can eliminate the steps shown in FIGS. 2-5 because the application logic knows that there is a trusted relationship already, so it can perform auto-complete and suggest the "shared-to" user as a trust user as the "shared-from" user (who is a local tenant user) types in the "shared-to" user's email address. This has a technical effect of shortening the lookup process, regardless what was shared with the "shared-to" user initially. That is, this is not a content-driven sharing process. Rather, the process builds on the trust between two specific tenants operating in a multitenancy environment.

Figure 9:
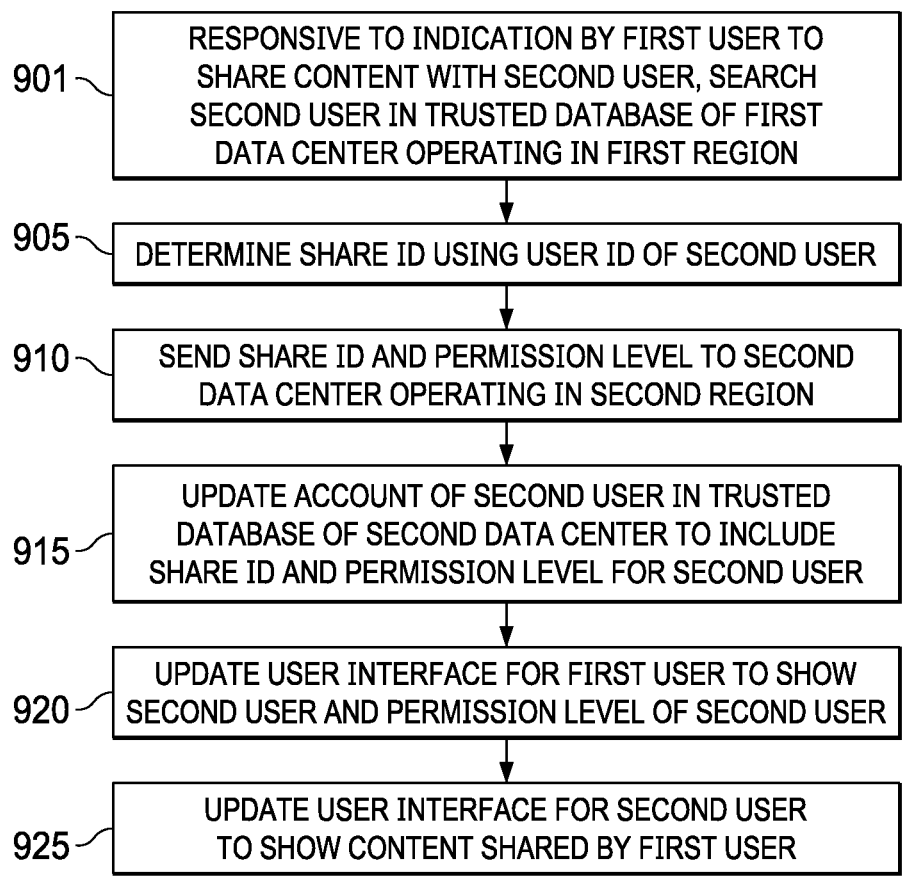
FIG. 9 is a flow chart illustrating a non-limiting example of a method for sharing content across data centers located in different geographical regions according to some embodiments disclosed herein.

To this end, a non-limiting example of a method for sharing content across data centers located in different geographical regions will now be described with reference to FIG. 9. In some embodiments, responsive to an indication from a first user to share content with a second user (e.g., the first user enters an email address of the second user in an input field of a GUI of an instance of an IM application disclosed herein), process 900 may operate to search the second user in a trusted database of a first data center operating in a first region (901). The first data center may host the instance of the IM application through which the first user has an account and is logged in.

As described above, when the user information is not found in the database local to the first data center, process 900 may operate to search the second user in a database of a second data center with which the first data center has a trusted relationship. The first data center and the second data center may operate distinctly and independently of each other in different geographical regions. When the second user is found in the database of the second data center, process 900 may operate to generate a unique identifier for the second user using limited user data of the second user stored in the database of the second data center (905). In one embodiment, the unique identifier can be a share ID generated by a computer of the first data center. In one embodiment, the computer may also generate an entry with the unique identifier for the second user and store the entry in a table of the first data center.

In some embodiments, process 900 may operate to communicate with a computer of the second data center regarding data to be shared by the first user to the second user. This communication may include the computer of the first data center sending the share ID and permission level (e.g., permissions to view and/or modify shared content as a viewer or a collaborator) to the second computer of the second data center (910).

In response, the computer of the second data center may operate to create, for the second user, a reference to the shared data. The reference to the shared data links the second user of the second data center with the shared data stored in the first data center and shared by the first user. In this case, the shared data is not moved or copied across the different geographical regions. However, the account of the second user is updated to include the share ID and the permission level for the second user (915).

Meanwhile, the instance of the IM application hosted by the first data center updates (e.g., in real time or near real time) the first user's GUI to include information on the second user (e.g., name and permission level of the second user) (920). As described above, the first user can manage the permission level and content sharing with the second user just like any other user with whom the first user has shared content. On the first user's GUI, the second user is only distinguished from other "shared-to" users through a distinct GUI element such as a link.

Likewise, the instance of the IM application hosted by the second data center where the second user has an account updates (e.g., in real time or near real time) the second user's GUI to show (e.g., in the second user's list of content) a representation of the shared content (925). As described above, the second user can view the shared content in the same way as any other content and, if permitted (e.g., the second user has a permission level as a collaborator), can edit the shared content as well.

Figure 10:
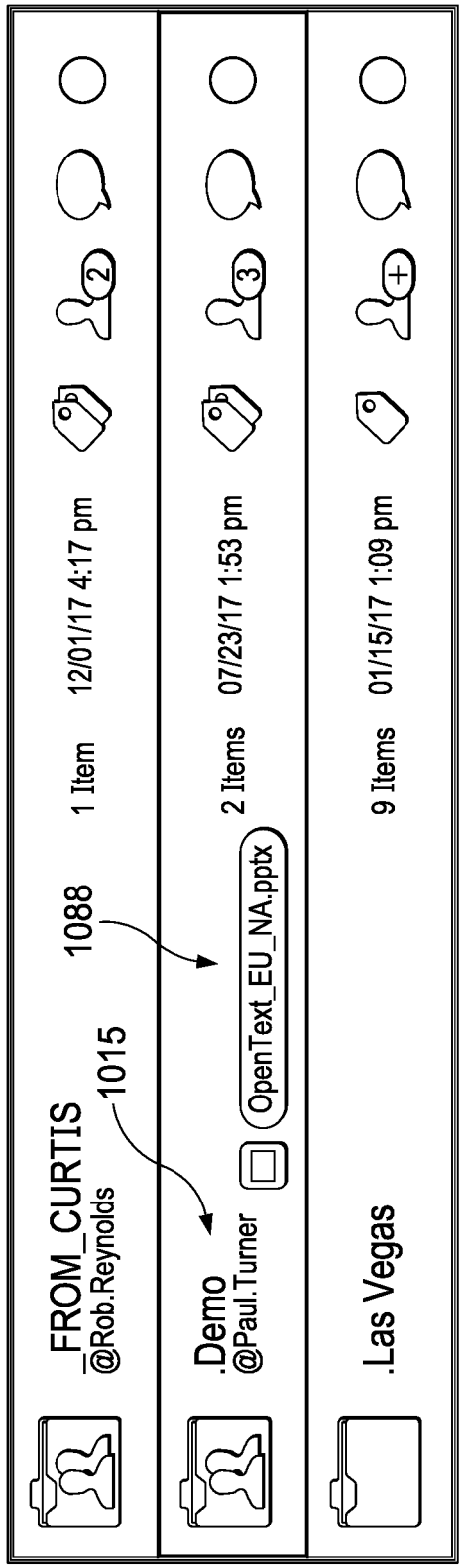
FIG. 10 depicts a diagrammatical representation of a user interface displaying a shared user list of users located in different geographical regions according to some embodiments disclosed herein.

Notice that there is a clear division of user information and content data. That is, the owner (e.g., owner 601 of FIG. 6) of the shared data retains control of the shared data. Referring to FIG. 10, suppose the second user in the above example creates file 1088 and uploads file 1088 through GUI 1000 to the first user's share (e.g., folder 1015). Because folder 1015 (the first user's share) is owned by the first user (who is in North America) and not the second user (who is in Europe), file 1088 is uploaded and stored in the owner's data center (which, in this case, in the NA system). The owner of the share where the content is shared is where the content is stored.

Figure 11:
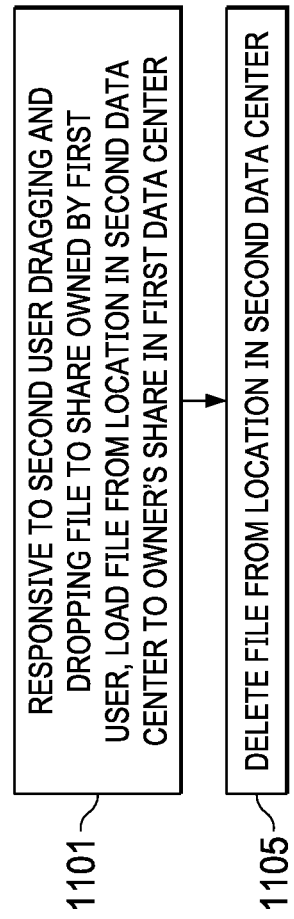
FIG. 11 is a flow chart illustrating a non-limiting example of a method for sharing content across data centers located in different geographical regions where content is stored at a particular data center per share ownership according to some embodiments disclosed herein.

FIG. 11 is a flow chart illustrating a non-limiting example of a method for sharing content across data centers located in different geographical regions where content is stored at a particular data center per share ownership. As described above, in some embodiments, responsive to a second user dragging and dropping a file, through a GUI of an instance of an IM application hosted on a second data center where the second user is located, to a share that is owned by a first user, the share logic of the instance is operable to load the file from a location in the second data center to the first user's share in the first data center (1101) and delete the file from the location in the second data center (1105). In response, the first data center creates a file entry in the first data center's database and a permission record (e.g., "perms" in FIG. 5) for the second user as a trusted user so the second user can view the file that he has created and that is now stored in the first user's share. If the first user (in this case, the owner of the share) removes the second user from the share (e.g., revoke the "viewer" permission), the second user would no longer have access to the file, even though the second user is the creator of the file. That is, whoever owns the share (e.g., folder 1015 in FIG. 10) owns, controls, and manages the content in the share.

Figure 12:
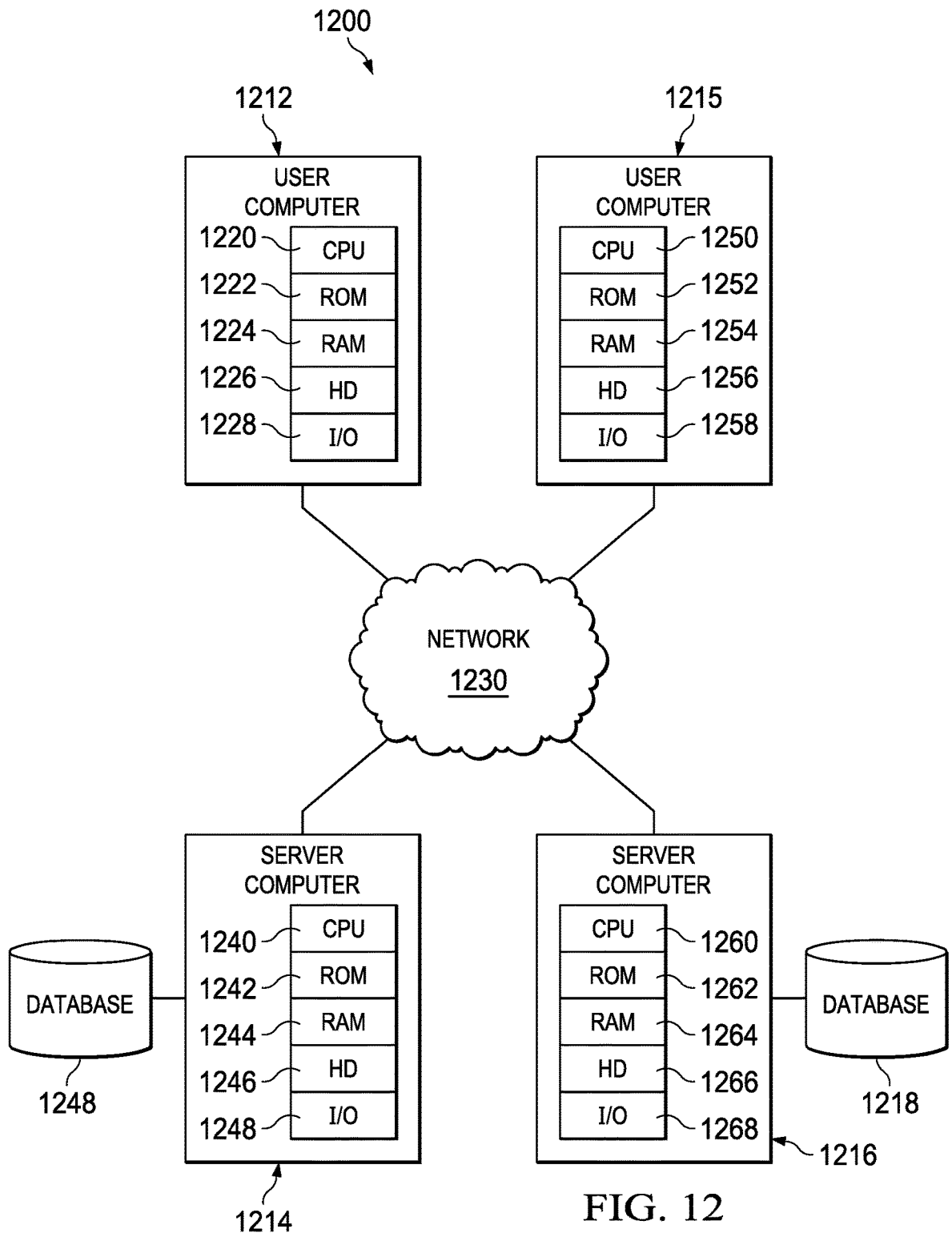
FIG. 12 depicts a diagrammatic representation of a distributed network computing environment where embodiments disclosed can be implemented.

FIG. 12 depicts a diagrammatic representation of a distributed network computing environment where embodiments disclosed can be implemented. In the example of FIG. 12, network computing environment 1200 may include network 1214 that can be bi-directionally coupled to user computer 1212, user computer 1215, server computer 1214, and server computer 1216. Server computer 1214 can be bi-directionally coupled to database 1248 and server computer 1216 can be bi-directionally coupled to database 1218. Network 1230 may represent a combination of wired and wireless networks that network computing environment 1200 may utilize for various types of network communications known to those skilled in the art.

For the purpose of illustration, a single system is shown for each of user computer 1212, user computer 1215, server computer 1214, and server computer 1216. However, within each of user computer 1212, user computer 1215, server computer 1214, and server computer 1216, a plurality of computers (not shown) may be interconnected to each other over network 1230. For example, a plurality of user computers may be communicatively connected over network 1230 to server computer 1214 implementing a data center in a geographical region and a plurality of user computers may be communicatively connected over network 1230 to server computer 1216 implementing another data center in another geographical region.

User computers 1212 may include data processing systems for communicating with server computer 1214. Likewise, user computers 1215 may include data processing systems for communicating with server computer 1216.

User computer 1212 can include central processing unit ("CPU") 1220, read-only memory ("ROM") 1222, random access memory ("RAM") 1224, hard drive ("HD") or storage memory 1226, and input/output device(s) ("I/O") 1228. I/O 1229 can include a keyboard, monitor, printer, electronic pointing device (e.g., mouse, trackball, stylus, etc.), or the like. User computer 1212 can include a desktop computer, a laptop computer, a personal digital assistant, a cellular phone, or nearly any device capable of communicating over a network. User computer 1215 may be similar to user computer 1212 and can comprise CPU 1250, ROM 1252, RAM 1254, HD 1256, and I/O 1258.

Likewise, server computer 1214 may include CPU 1240, ROM 1242, RAM 1244, HD 1246, and I/O 1248 and server computer 1216 may include CPU 1260, ROM 1262, RAM 1264, HD 1266, and I/O 1268. Server computers 1214 and 1216 may each include one or more backend systems configured for providing an instance of an application to user computers 1212 over network 1230. Many other alternative configurations are possible and known to skilled artisans.

Each of the computers in FIG. 12 may have more than one CPU, ROM, RAM, HD, I/O, or other hardware components. For the sake of brevity, each computer is illustrated as having one of each of the hardware components, even if more than one is used. Each of computers 1212, 1214, 1215, and 1216 is an example of a data processing system. ROM 1222, 1242, 1252, and 1262; RAM 1224, 1244, 1254, and 1264; HD 1226, 1246, 1256, and 1266; and database 1218 and 1248 can include media that can be read by CPU 1220, 1240, 1250, or 1260. Therefore, these types of memories include non-transitory computer-readable storage media. These memories may be internal or external to computers 1212, 1214, 1215, or 1216.

Portions of the methods described herein may be implemented in suitable software code that may reside within ROM 1222, 1242, 1252, or 1262; RAM 1224, 1244, 1254, or 1264; or HD 1226, 1246, 1256, or 1266. In addition to those types of memories, the instructions in an embodiment disclosed herein may be contained on a data storage device with a different computer-readable storage medium, such as a hard disk. Alternatively, the instructions may be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. The scope of the present disclosure should be determined by the following claims and their legal equivalents.

What is claimed is:

1. A method, comprising:
  searching, by a first data center computer utilizing information of a second user provided by a first user of the first data center computer, the second user in a database local to the first data center computer;
  responsive to the information of the second user not being found in the database local to the first data center computer, searching, by the first data center computer through a trusted connection with a second data center computer, the second user in a database local to the second data center computer, the first data center computer and the second data center computer operating distinctly and independently of each other and in different geographical regions that have different data protection or privacy requirements;

generating, by the first data center computer utilizing limited user data of the second user stored in the database local to the second data center computer, a unique identifier for the second user;

generating, by the first data center computer, an entry containing the limited user data of the second user and the unique identifier for the second user;

storing, by the first data center computer, the entry in a trust table local to the first data center computer, the entry representing the second user of the second data center computer in the first data center computer;

generating, by the first data center computer, a trust user identifier structure using the unique identifier for the second user;

storing, by the first data center computer, the trust user identifier structure in an entry for a share, the share having a share identifier and stored in the first data center computer; and requesting, by the first data center computer, the second data center computer to create an entry representing the share based on the share identifier and permission information associated with the share for the second user such that the share stored in the first data center computer is shared by the first user of the first data center computer to the second user of the second data center computer.

2. The method according to claim 1, wherein the information of the second user provided by the first user of the first data center computer comprises an email address of the second user.

3. The method according to claim 1, further comprising:
communicating the share identifier and the permission information associated with the share for the second user from the first data center computer to the second data center computer, the permission information comprising a permission for the second user to view or modify content in the share.

4. The method according to claim 1, wherein the limited user data comprises a name and an email address of the second user.

5. The method according to claim 1, further comprising:
providing a user interface on a user device of the first user for managing a permission level of the second user.

6. The method according to claim 1, wherein the share is owned by the first user.

7. The method according to claim 6, wherein a file uploaded to the share by the second user is stored in the first data center computer and owned by the first user.

8. A system, comprising:
a processor;
a non-transitory computer-readable medium; and
instructions stored on the non-transitory computer-readable medium and translatable by the processor for hosting an instance of an application on a first data center computer, the instructions when translated by the processor perform:
searching, utilizing information of a second user provided by a first user of the first data center computer, the second user in a database local to the first data center computer;
responsive to the information of the second user not being found in the database local to the first data center computer, searching, through a trusted connection with a second data center computer, the second user in a database local to the second data center computer, the first data center computer and the second data center computer operating distinctly and independently of each other and in different geographical regions that have different data protection or privacy requirements;

generating, utilizing limited user data of the second user stored in the database local to the second data center computer, a unique identifier for the second user;

generating an entry containing the limited user data of the second user and the unique identifier for the second user;

storing the entry in a trust table local to the first data center computer, the entry representing the second user of the second data center computer in the first data center computer;

generating a trust user identifier structure using the unique identifier for the second user;

storing the trust user identifier structure in an entry for a share, the share having a share identifier and stored in the first data center computer; and requesting the second data center computer to create an entry representing the share based on the share identifier and permission information associated with the share for the second user such that the share stored in the first data center computer is shared by the first user of the first data center computer to the second user of the second data center computer.

9. The system of claim 8, wherein the information of the second user provided by the first user of the first data center computer comprises an email address of the second user.

10. The system of claim 8, wherein the instructions when translated by the processor further perform:
communicating the share identifier and the permission information associated with the share for the second user from the first data center computer to the second data center computer, the permission information comprising a permission for the second user to view or modify content in the share.

11. The system of claim 8, wherein the limited user data comprises a name and an email address of the second user.

12. The system of claim 8, wherein the instructions when translated by the processor further perform:
providing a user interface on a user device of the first user for managing a permission level of the second user.

13. The system of claim 8, wherein the share is owned by the first user.

14. The system of claim 13, wherein a file uploaded to the share by the second user is stored in the first data center computer and owned by the first user.

15. A computer program product comprising a non-transitory computer-readable medium storing instructions translatable by a processor of a first data center computer for:
searching, utilizing information of a second user provided by a first user of the first data center computer, the second user in a database local to the first data center computer;
responsive to the information of the second user not being found in the database local to the first data center computer, searching, through a trusted connection with a second data center computer, the second user in a database local to the second data center computer, the first data center computer and the second data center computer operating distinctly and independently of each other and in different geographical regions that have different data protection or privacy requirements;

generating, utilizing limited user data of the second user stored in the database local to the second data center computer, a unique identifier for the second user;

generating an entry containing the limited user data of the second user and the unique identifier for the second user;

storing the entry in a trust table local to the first data center computer, the entry representing the second user of the second data center computer in the first data center computer;

generating a trust user identifier structure using the unique identifier for the second user;

storing the trust user identifier structure in an entry for a share, the share having a share identifier and stored in the first data center computer; and requesting the second data center computer to create an entry representing the share based on the share identifier and permission information associated with the share for the second user such that the share stored in the first data center computer is shared by the first user of the first data center computer to the second user of the second data center computer.

16. The computer program product of claim 15, wherein the information of the second user provided by the first user of the first data center computer comprises an email address of the second user.

17. The computer program product of claim 15, wherein the instructions when translated by the processor further perform:

communicating the share identifier and the permission information associated with the share for the second user from the first data center computer to the second data center computer, the permission information comprising a permission for the second user to view or modify content in the share.

18. The computer program product of claim 15, wherein the limited user data comprises a name and an email address of the second user.

19. The computer program product of claim 15, wherein the instructions when translated by the processor further perform:

providing a user interface on a user device of the first user for managing a permission level of the second user.

20. The computer program product of claim 15, wherein the share is owned by the first user and wherein a file uploaded to the share by the second user is stored in the first data center computer and owned by the first user.

* * * * *